United States Patent
Han et al.

(10) Patent No.: US 10,654,361 B2
(45) Date of Patent: May 19, 2020

(54) ACCELERATOR PEDAL FOR VEHICLE WHICH HAS HYSTERESIS

(71) Applicant: KYUNG CHANG INDUSTRIAL CO., Ltd., Dalseo-gu, Daegu (KR)

(72) Inventors: Jong Hee Han, Daegu (KR); Ki Chul Hyun, Daegu (KR); Hyeon UK Kim, Daegu (KR)

(73) Assignee: KYUNG CHANG INDUSTRIAL CO., LTD. (KR)

( * ) Notice: Subject to any disclaimer, the term of this patent is extended or adjusted under 35 U.S.C. 154(b) by 0 days.

(21) Appl. No.: 16/387,770

(22) Filed: Apr. 18, 2019

(65) Prior Publication Data

US 2019/0322173 A1    Oct. 24, 2019

(30) Foreign Application Priority Data

Apr. 23, 2018    (KR) .......................... 10-2018-0046610

(51) Int. Cl.
  *B60K 26/02*    (2006.01)
  *G05G 1/44*    (2008.04)
  *G05G 5/03*    (2008.04)

(52) U.S. Cl.
  CPC ............. *B60K 26/021* (2013.01); *G05G 1/44* (2013.01); *G05G 5/03* (2013.01); *G05G 2505/00* (2013.01)

(58) Field of Classification Search
  CPC ........ B60K 26/02; B60K 26/021; G05G 5/03; G05G 1/44
  See application file for complete search history.

(56) References Cited

U.S. PATENT DOCUMENTS

| 2010/0206122 A1* | 8/2010 | Seiltz | G05G 1/38 74/512 |
| 2014/0090512 A1* | 4/2014 | Kaijala | G05G 1/38 74/514 |

(Continued)

FOREIGN PATENT DOCUMENTS

| DE | 102008018140 A1 * | 10/2009 |
| DE | 102014214942 A1 * | 2/2016 |

(Continued)

OTHER PUBLICATIONS

KIPO Machine Translation of KR 10-2012-0129216, Nov. 28, 2012 (Year: 2012).*

(Continued)

*Primary Examiner* — Vinh Luong
(74) *Attorney, Agent, or Firm* — The Belles Group, P.C.

(57) ABSTRACT

An accelerator pedal for a vehicle, which has a hysteresis generation structure may be provided. The accelerator pedal for a vehicle includes: a housing; a cylindrical hinge which is connected to the housing; a main pedal arm which is coupled to one side of the hinge and rotates in a first direction in close contact with a first action point of the one side of the hinge when a predetermined force is applied; an auxiliary pedal arm which is coupled to the other side of the hinge and rotates in a second direction in close contact with a second action point of the other side of the hinge by an elastic force when the force applied to the main pedal arm is removed; and a spring which is coupled to a bottom of one end of the auxiliary pedal arm and applies the elastic force to the auxiliary pedal arm.

11 Claims, 8 Drawing Sheets

(56) References Cited

U.S. PATENT DOCUMENTS

| | | | | |
|---|---|---|---|---|
| 2015/0128755 A1* | 5/2015 | Kaijala | ................. | G05G 25/04 |
| | | | | 74/514 |
| 2016/0342173 A1* | 11/2016 | Byun | ....................... | G05G 5/05 |
| 2018/0239389 A1* | 8/2018 | Neubauer | ................ | G05G 1/44 |
| 2018/0253120 A1* | 9/2018 | Kim | ........................ | G05G 1/38 |
| 2019/0359055 A1* | 11/2019 | Park | ....................... | B60K 26/02 |
| 2019/0361480 A1* | 11/2019 | Kim | ....................... | B60K 26/02 |

FOREIGN PATENT DOCUMENTS

| | | |
|---|---|---|
| KR | 10-2012-0129216 A | 11/2012 |
| KR | 10-2012-0137815 A | 12/2012 |
| KR | 10-2013-0051834 A | 5/2013 |

OTHER PUBLICATIONS

EPO Machine Translation of DE102008018140 (A1),Heinrich, Oct. 15, 2009 (Year: 2009).*

Define point-Google Search, google.com., Aug. 27, 2019 (Year: 2019).*

Definition of Refer by Merriam-Webster, merriam-webster.com/dictionary., Dec. 11, 2019 (Year: 2019).*

Definition of Region by Merriam-Webster, merriam-webster.com/dictionary., Dec. 19, 2019 (Year: 2019).*

Dewent Abstract of DE 102014214942 A1, Cizek, Feb. 4, 2016 (Year: 2016).*

\* cited by examiner

__US 10,654,361 B2__

ACCELERATOR PEDAL FOR VEHICLE WHICH HAS HYSTERESIS

CROSS-REFERENCE TO RELATED PATENT APPLICATIONS

The present application claims priority to Korean Patent Application No. 10-2018-0046610, filed Apr. 23, 2018. The disclosure of the aforementioned priority application is incorporated herein by reference in its entirety.

BACKGROUND

Field

The present disclosure relates to an accelerator pedal for a vehicle and more particularly to an accelerator pedal for a vehicle, which has a hysteresis generation structure.

Description of the Related Art

An accelerator pedal accelerates the rotation of an engine. Acceleration by the increase of the rotation speed of the engine is performed by stepping on the accelerator pedal, and the rotation speed of the engine is reduced by taking one's foot off the accelerator pedal. The accelerator pedal is connected to a throttle valve by wire and linkage. The throttle valve is opened by stepping on the accelerator pedal, so that air is introduced into the cylinder. Then, an electronic control fuel injection device detects the amount of air and supplies gasoline suitable for the engine operating condition.

The accelerator pedal includes a mechanical accelerator pedal and an electronic accelerator pedal. In the mechanical accelerator pedal, the throttle valve of the engine and the accelerator pedal are mechanically connected to each other by a cable. In the electronic accelerator pedal, the position of the pedal is sensed by a sensor and the operation of the throttle is controlled based on the sensed position signal.

The mechanical accelerator pedal causes operational problems due to ambient environment, temperature changes, the deterioration of the cable, etc. Therefore, at present, the mechanical accelerator pedal has been replaced by the electronic accelerator pedal. The electronic accelerator pedal requires no cable. Accordingly, the electronic accelerator pedal has advantages of having an enough installation space thereof, of reducing the fatigue of a driver, and of improving the fuel efficiency.

However, the driver prefers tactile response felt by the driver in a conventional mechanical accelerator pedal. Also, in order to reduce the fatigue of the driver due to the operation of the electronic accelerator pedal, hysteresis must be generated.

A hysteresis generation technology applied to a conventional electronic accelerator pedal includes a structure friction method, a housing friction method, and the like. However, these methods have a complex structure and require a lot of parts.

SUMMARY

One embodiment is an accelerator pedal for a vehicle, which includes: a housing; a cylindrical hinge which is connected to the housing; a main pedal arm which is coupled to one side of the hinge and rotates in a first direction in close contact with a first action point of the one side of the hinge when a predetermined force is applied; an auxiliary pedal arm which is coupled to the other side of the hinge and rotates in a second direction in close contact with a second action point of the other side of the hinge by an elastic force when the force applied to the main pedal arm is removed; and a spring which is coupled to a bottom of one end of the auxiliary pedal arm and applies the elastic force to the auxiliary pedal arm.

The main pedal arm may include a receiving recess formed in a lower portion thereof fixed to the housing. The main pedal arm may include through-holes to which the hinge is inserted and coupled and which are formed on both sides of the receiving recess.

In the main pedal arm, a contact surface which has a predetermined curvature so as to come in contact with an outer circumference of one side of the hinge may be formed inside the receiving recess disposed between the through-holes to which the hinge is inserted and coupled.

The auxiliary pedal arm may be inserted into the receiving recess. An insertion recess to which the spring is inserted and coupled may be formed in a lower portion of one end of the auxiliary pedal arm. A contact surface which has a predetermined curvature so as to come in contact with an outer circumference of the other side of the hinge may be formed in an upper portion of the other end of the auxiliary pedal arm.

A protrusion may be formed on one surface of the insertion recess formed in the auxiliary pedal arm. The protrusion may be disposed to be inserted into the inside of the spring.

An opening may be formed above the through-hole formed in the main pedal arm. The other end of the auxiliary pedal arm may be disposed to be inserted into the opening.

The main pedal arm transmits the force to the auxiliary pedal arm while rotating in the first direction in close contact with the first action point of the hinge, so that the spring coupled to a bottom of one end of the auxiliary pedal arm may be compressed.

The auxiliary pedal arm may transmit the force to the main pedal arm while rotating in the second direction in close contact with the second action point of the hinge by the elastic force of the coupled spring.

The housing may include a first housing and a second housing. A protrusion to which the hinge is coupled may be formed inside the first housing.

A groove may be formed on at least one side of the protrusion in a longitudinal direction of the protrusion. A projection which is inserted into the groove of the protrusion may be formed inside the hinge.

DETAILED DESCRIPTION

Figure 1:
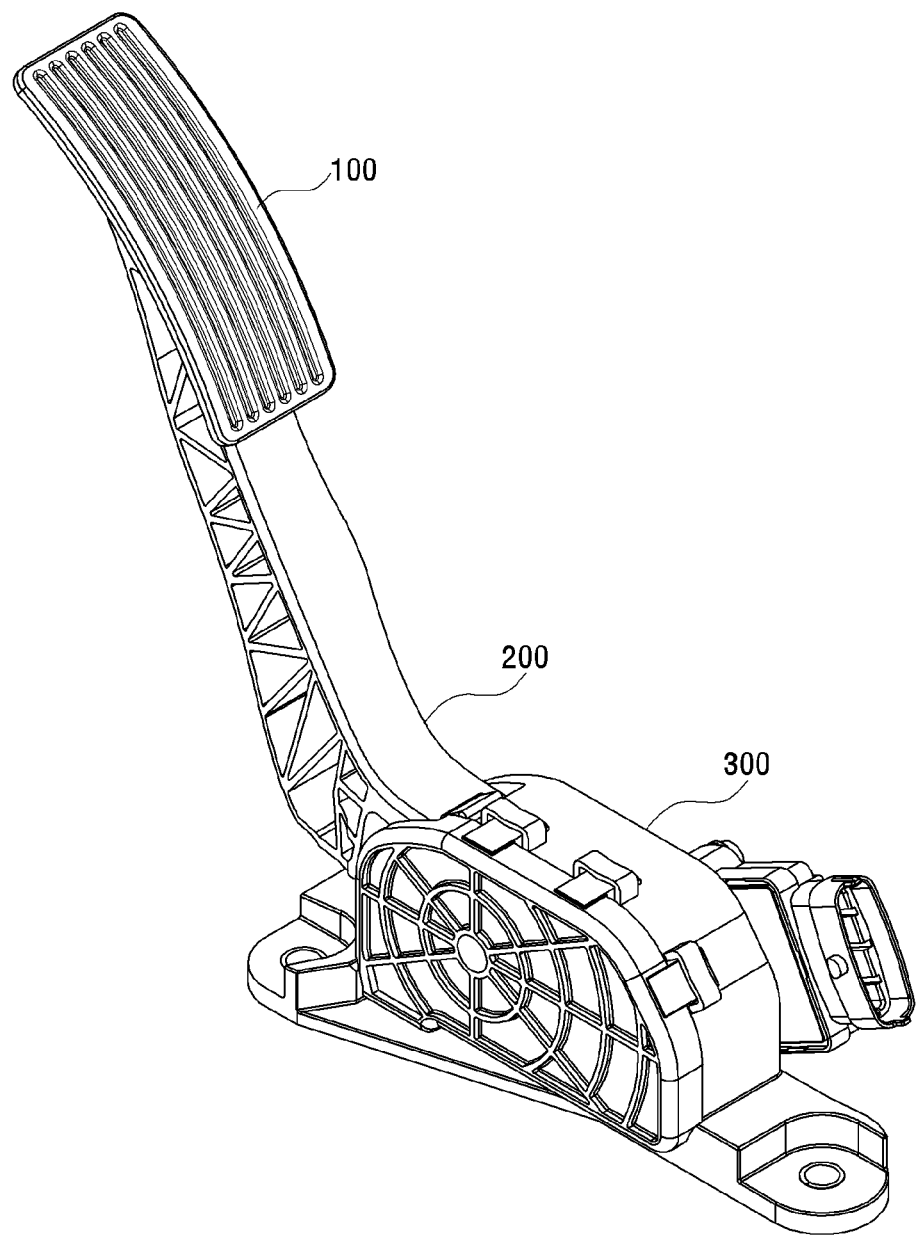
FIG. 1 shows an accelerator pedal for a vehicle according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereinafter, an accelerator pedal for a vehicle, which has a hysteresis generation structure according to an embodiment of the present invention will be described with reference to the accompanying drawings. Particularly, the embodiment of the present invention proposes a new method in which when a driver applies a force to a main pedal arm, the main pedal arm compresses a spring of an auxiliary pedal arm while rotating in a first direction in close contact with a first action point of a hinge, and when the force applied to the main pedal arm is removed, the spring of the auxiliary pedal arm is restored by the elastic force of the spring, and the auxiliary pedal arm is closely contacted with a second action point of the hinge and is rotated in a second direction, so that the main pedal arm is pushed.

Figure 2A:
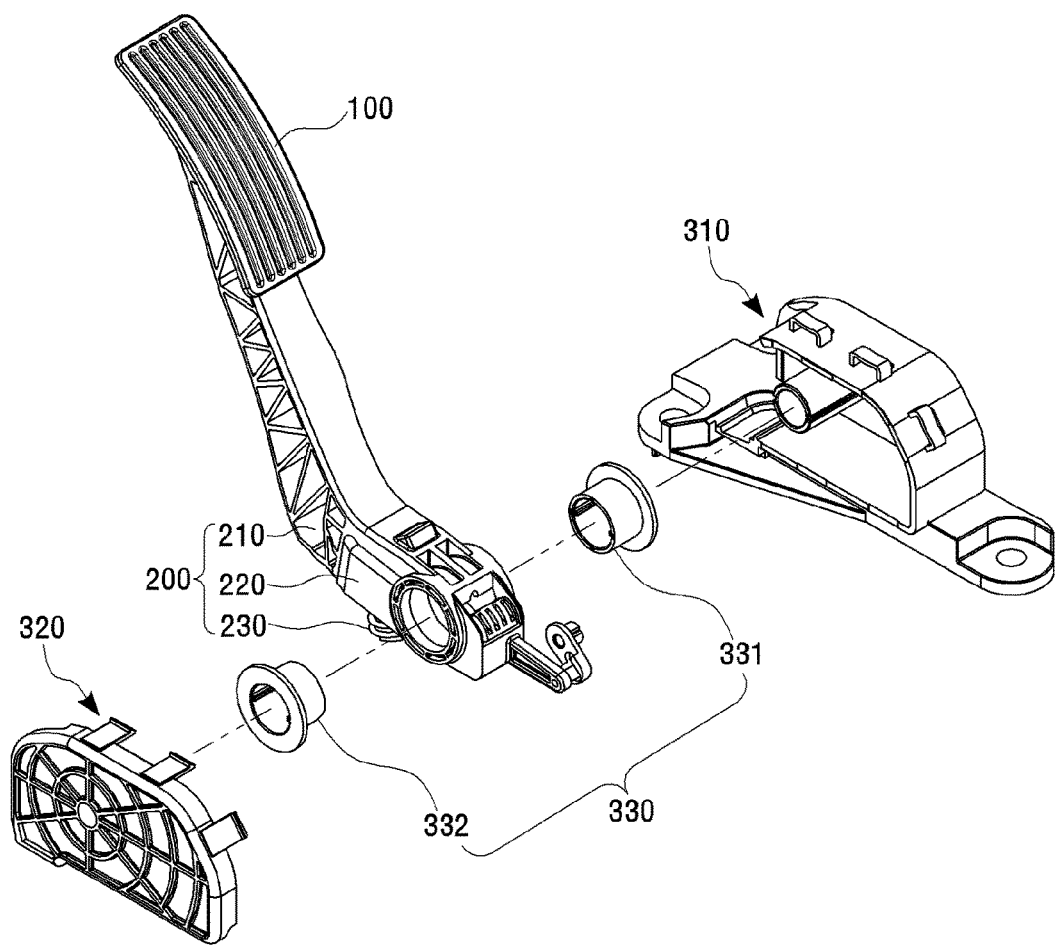
FIGS. 2a to 2b are exploded perspective views showing the accelerator pedal for a vehicle shown in FIG. 1.
Figure 2B:
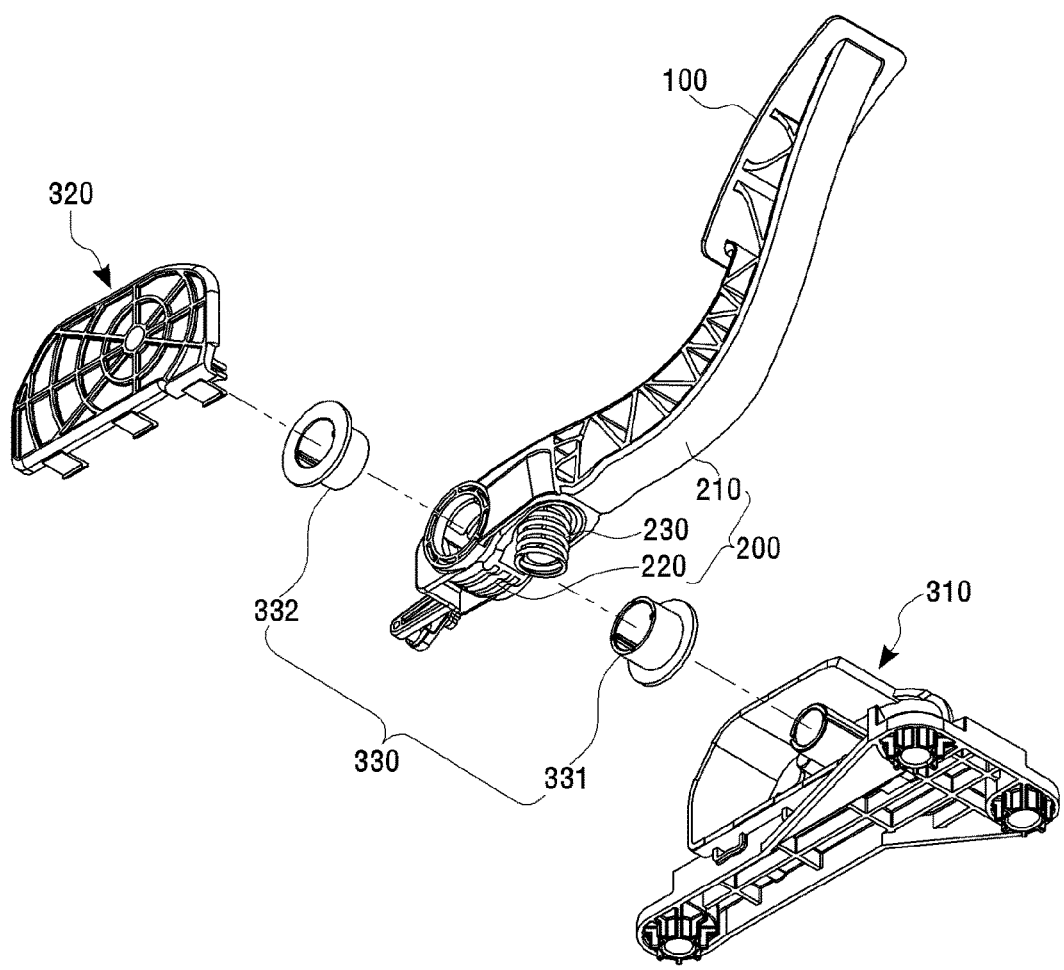

FIG. 1 shows an accelerator pedal for a vehicle according to an embodiment of the present invention. FIGS. 2a to 2b are exploded perspective views showing the accelerator pedal for a vehicle shown in FIG. 1.

Referring to FIGS. 1 to 2b, the accelerator pedal for a vehicle according to the embodiment of the present invention may include a pedal pad 100, a pedal arm 200, and a housing 300.

The pedal pad 100 transmits a pedal effort of a driver to the pedal arm 200, thereby rotating the pedal arm 200 about a hinge. The pedal pad 100 may be formed to have a flat surface in order to allow the driver to easily operate the pedal pad 100.

The pedal arm 200 may rotate while being coupled to the hinge and may include a main pedal arm 210 and an auxiliary pedal arm 220. The main pedal arm 210 and the auxiliary pedal arm 220 may be formed in a separate form rather than being physically coupled, and may be formed in a shape in which the auxiliary pedal arm 220 is inserted into a receiving space of the main pedal arm 210.

A spring is disposed below the pedal arm 200. When the driver steps on the pedal pad 100, the pedal effort is applied to the pedal arm 200. Then, the pedal arm 200 is rotated about the hinge and the spring is compressed. An electronic accelerator pedal position (APP) sensor (not shown) senses the amount of rotation of the pedal arm and generates and transmits an electrical signal to a throttle controller. The throttle controller operates an actuator on the basis of the electronic signal received from the sensor, so that the opening and closing of the throttle valve is controlled and combustion amount is controlled.

When the driver takes his/her foot off the pedal pad 100, the pedal arm 200 is rotated in on opposite direction to the rotation direction thereof by an elastic force of the compressed spring and returns to its initial position.

The housing 300 may be fixed to the vehicle and may include a first housing 310 and a second housing 320. The hinge 330 may be coupled to a protrusion formed inside the first housing 310 and the pedal arm 200 may be coupled to the hinge 330.

Figure 3A:
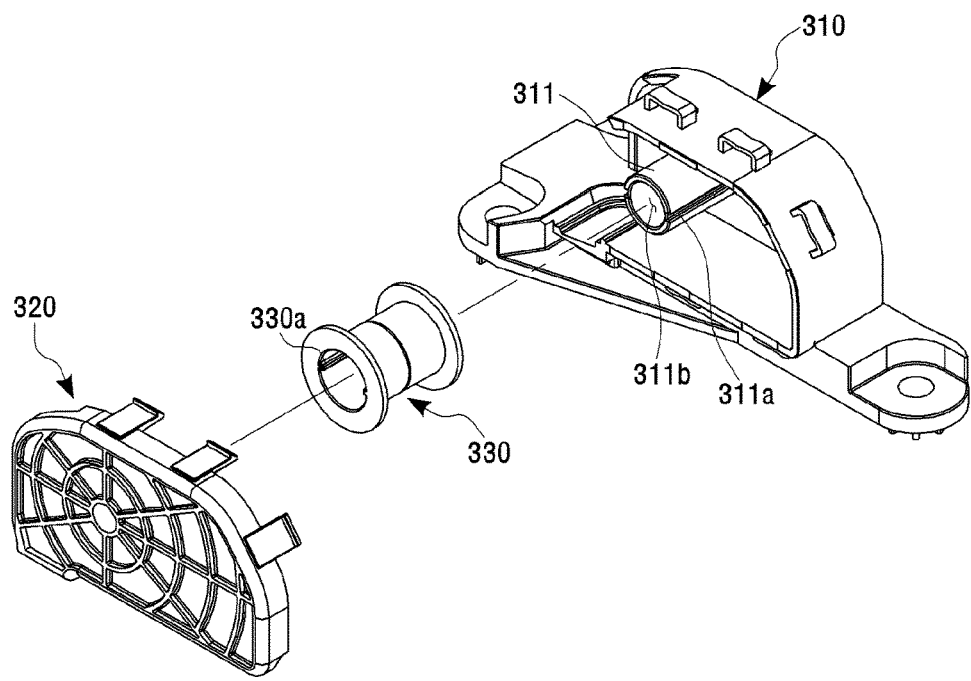
FIGS. 3a to 3b are views for describing the coupling relationship between a housing and a hinge shown in FIG. 1.
Figure 3B:
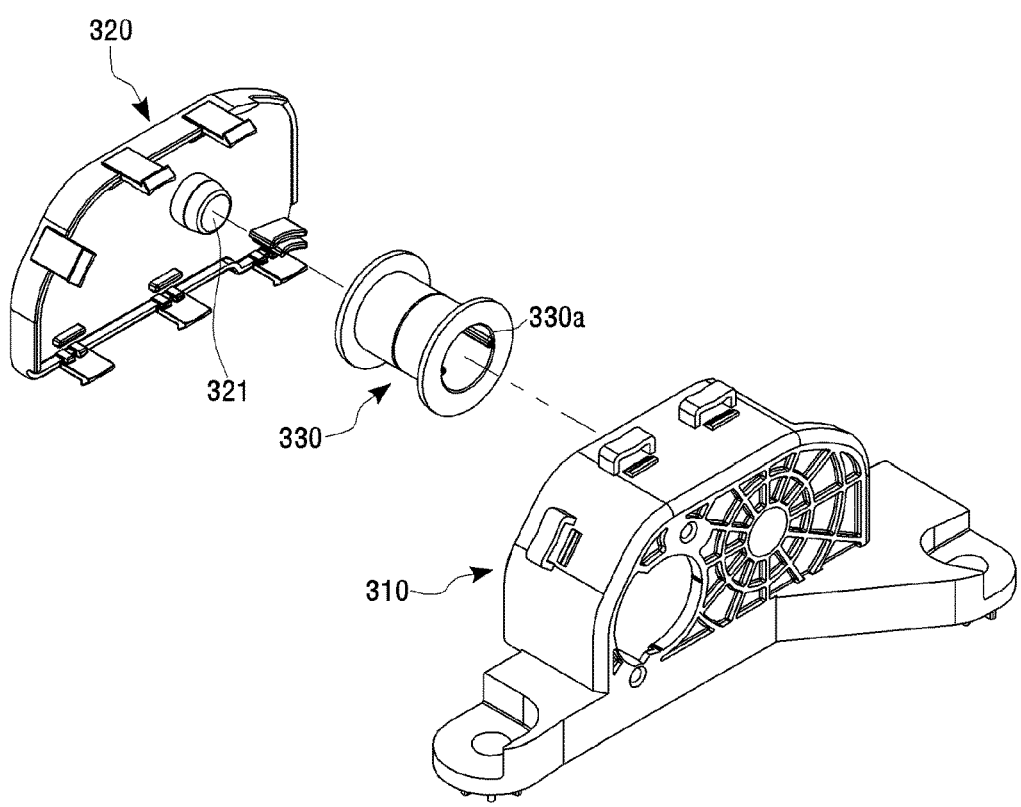

FIGS. 3a to 3b are views for describing the coupling relationship between the housing and the hinge shown in FIG. 1.

Referring to FIGS. 3a to 3b, the housing 300 according to the embodiment of the present invention may include the first housing 310 and the second housing 320. A first protrusion 311 may be formed inside the first housing 310 and may be inserted and coupled to the inside of one side of the hinge 330. A second protrusion 321 may be formed inside the second housing 320 and may be inserted and coupled to the inside of the other side of the hinge 330.

Also, the hinge 330 may include a first hinge portion 331 and a second hinge portion 332.

The first protrusion 311 may be formed in a cylindrical shape and may have a guide groove 311a formed on at least one side of the first protrusion 311 in the longitudinal direction of the first protrusion 311. A projection 330a which is inserted into the guide groove 311a formed in the first protrusion 311 may be formed inside the hinge 330 in the longitudinal direction of the hinge 330. That is, the projection 330a formed inside the hinge 330 is coupled to the guide groove 311a formed in the first protrusion 311, so that the hinge 330 can be fixed to the first housing 310.

Conversely, the projection may be formed on at least one side of the first protrusion 311 in the longitudinal direction of the first protrusion 311 and the guide groove may be formed inside the hinge 330 in the longitudinal direction of the hinge 330.

Also, the first protrusion 311 may be formed in a cylindrical shape. A coupling recess 311b may be formed on an end portion of the first protrusion 311. The second protrusion 321 may be inserted into and fixed to the coupling recess 311b.

Figure 4A:
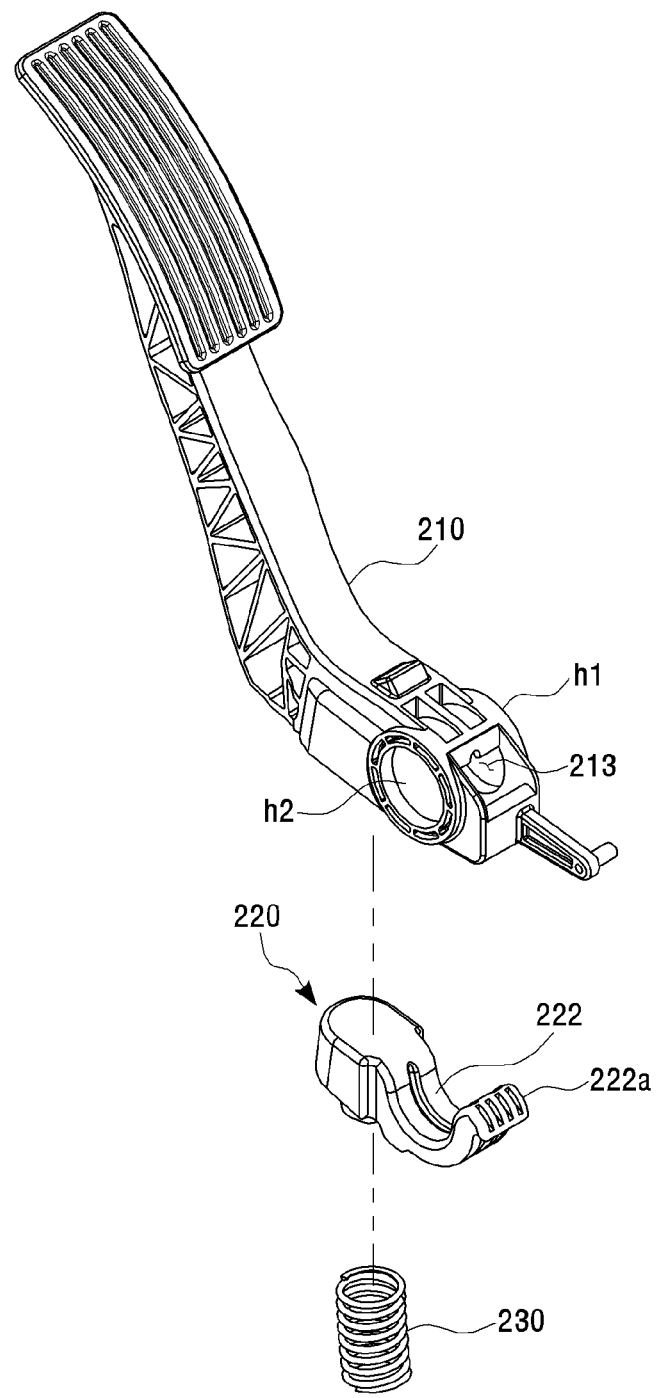
FIGS. 4a to 4b are exploded perspective views of a pedal arm shown in FIG. 1.
Figure 4B:
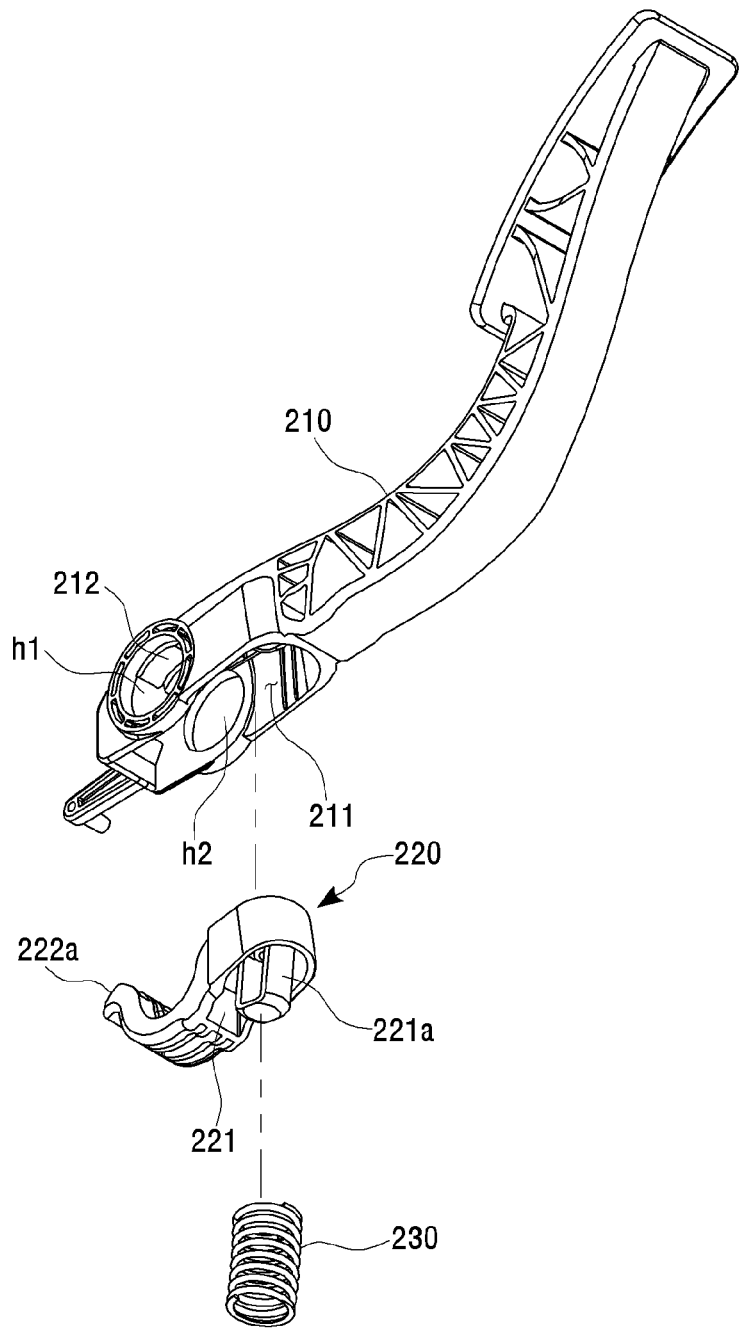

FIGS. 4a to 4b are exploded perspective views of the pedal arm shown in FIG. 1.

Referring to FIGS. 4a to 4b, the pedal arm 200 according to the embodiment of the present invention may include the main pedal arm 210, the auxiliary pedal arm 220, and the spring 230.

The main pedal arm 210 may be coupled to one side of the hinge 330. When a predetermined force is applied, the main pedal arm 210 may rotate in a first direction in close contact with a first action point of the hinge 330. For a time during which the main pedal arm 210 rotates in close contact with the first action point of the hinge 330, hysteresis may be generated by friction at the first action point. Here, the first action point refers to a region within the outer circumference of one side of the hinge 330, where the friction is generated by contact between the main pedal arm 210 and the hinge 330.

The main pedal arm 210 may have a receiving recess 211 formed in the lower portion of the end thereof fixed to the housing. The auxiliary pedal arm 220 may be disposed in the receiving recess 211. Through-holes h1 and h2 are formed on both sides of the receiving recess 211. The hinge 330 may be inserted and coupled to the through-holes h1 and h2.

A contact surface 212 contacting the outer circumference of one side of the hinge which is inserted and coupled to the through-holes may be formed inside the receiving recess 211 of the main pedal arm 210, that is, the inside between the through-holes h1 and h2. The contact surface 212 may be formed as a curved surface with a predetermined curvature and acts as the first action point between the main pedal arm 210 and the hinge. Then, the friction may be generated for a time during which the main pedal arm 210 rotates in close contact with the hinge. Hysteresis may be generated differently depending on the shape of the contact surface.

An opening 213 may be formed above the through-holes h1 and h2 of the main pedal arm 210. One end of the auxiliary pedal arm 220 may be disposed to be inserted into the opening 213.

The auxiliary pedal arm 220 may be coupled to the other side of the hinge 330. When the applied force is removed, the auxiliary pedal arm 220 may rotate in a second direction in close contact with the second action point of the hinge 330. For a time during which the auxiliary pedal arm 220 rotates in close contact with the second action point of the hinge 330, hysteresis may be generated by friction at the second action point. Here, the second action point refers to a region within the outer circumference of the other side of the hinge 330, where the friction is generated by contact between the auxiliary pedal arm 220 and the hinge 330.

The auxiliary pedal arm 220 may be disposed to be inserted into the receiving recess 211 of the main pedal arm 210. The spring 230 applying an elastic force may be coupled to the bottom of the auxiliary pedal arm 220. In other words, an insertion recess 221 to which the spring 230 is inserted and coupled may be formed in the lower portion of one end of the auxiliary pedal arm 220. A contact surface 222 contacting the outer circumference of the other side of the hinge may be formed in the upper portion of the other end of the auxiliary pedal arm 220. The contact surface may be formed as a curved surface with a predetermined curvature and acts as the second action point between the auxiliary pedal arm 220 and the hinge. Then, the friction may be generated for a time during which the auxiliary pedal arm 220 rotates in close contact with the hinge. Hysteresis may be generated differently depending on the shape of the contact surface.

Also, the other end 222a of the auxiliary pedal arm 220 may be formed to have a curved shape in such a manner as to be inserted into and caught by the opening 213 of the main pedal arm 210.

Also, a protrusion 221a may be formed within the insertion recess 221 of the auxiliary pedal arm 220. The protrusion 221a may be inserted into the inside of the spring 230. The length of the protrusion 221a may be less than the length of the spring 230.

The spring 230 may have a predetermined modulus of elasticity and may be received in the vicinity of the region where the pedal arm and the housing are connected, that is to say, the region where the hinge 330 is positioned. The spring 230 may be disposed below the auxiliary pedal arm 220 such that the spring 230 is compressed by the rotation of the auxiliary pedal arm 220. The top of the spring 230 may be fixed to one surface of the auxiliary pedal arm 220 and the bottom of the spring 230 may be fixed to one surface of the first housing. Separate members for fixing the spring 230 may be further included.

As the main pedal arm 210 rotates in the first direction in close contact with the first action point $F_{p2}$, the auxiliary pedal arm 220 receives the force in the first direction by contact between the inside of the receiving recess 211 of the main pedal arm 210 and one end of the auxiliary pedal arm. Thus, the spring 230 coupled to the bottom of the auxiliary pedal arm 220 may be compressed.

When the force applied to the main pedal arm 210 is removed, the auxiliary pedal arm 220 rotates in the second direction in close contact with the second action point $F_{s2}$ of the hinge by the elastic force of the spring 230. Thus, the force may be applied in the second direction by contact between the inside of the receiving recess of the main pedal arm 210 and one end of the auxiliary pedal arm.

Figure 5:
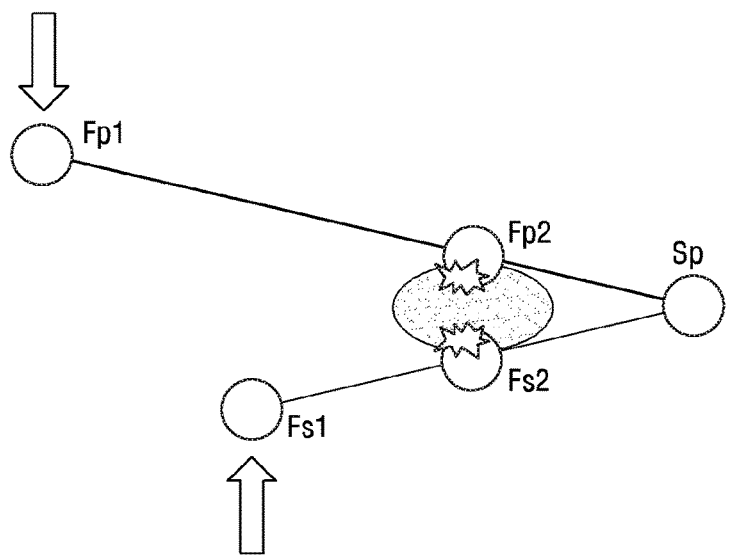
FIG. 5 is a view for describing the operation principle of the pedal arm according to the embodiment of the present invention.

FIG. 5 is a view for describing the operation principle of the pedal arm according to the embodiment of the present invention.

Referring to FIG. 5, a supporting point Sp is formed by coupling one end of the main pedal arm and one end of the auxiliary pedal arm. The hinge is disposed between the main pedal arm and the auxiliary pedal arm, the main pedal arm rotates in the first direction, that is, counterclockwise, in close contact with the first action point $F_{p2}$ of the hinge by a load point $F_{p1}$ to which the load of the pedal pad is applied, and the auxiliary pedal arm rotates in the second direction, that is, clockwise, in close contact with the second action point $F_{s2}$ of the hinge by a load point $F_{s1}$ to which the load of the spring is applied.

As such, according to the embodiment of the present invention, hysteresis can be generated by friction at the two action points between the pedal arm and the hinge, that is, the first action point $F_{p2}$ and the second action point $F_{s2}$, without generating hysteresis by using a separate friction member.

Figure 6A:
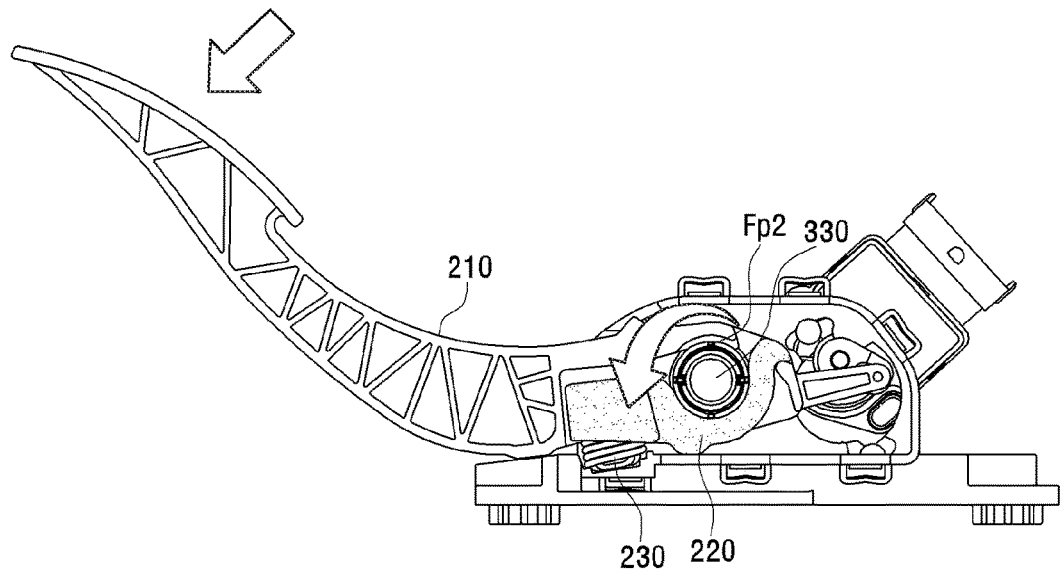
FIGS. 6a to 6b are views for describing the operation of the accelerator pedal for a vehicle according to the embodiment of the present invention.
Figure 6B:
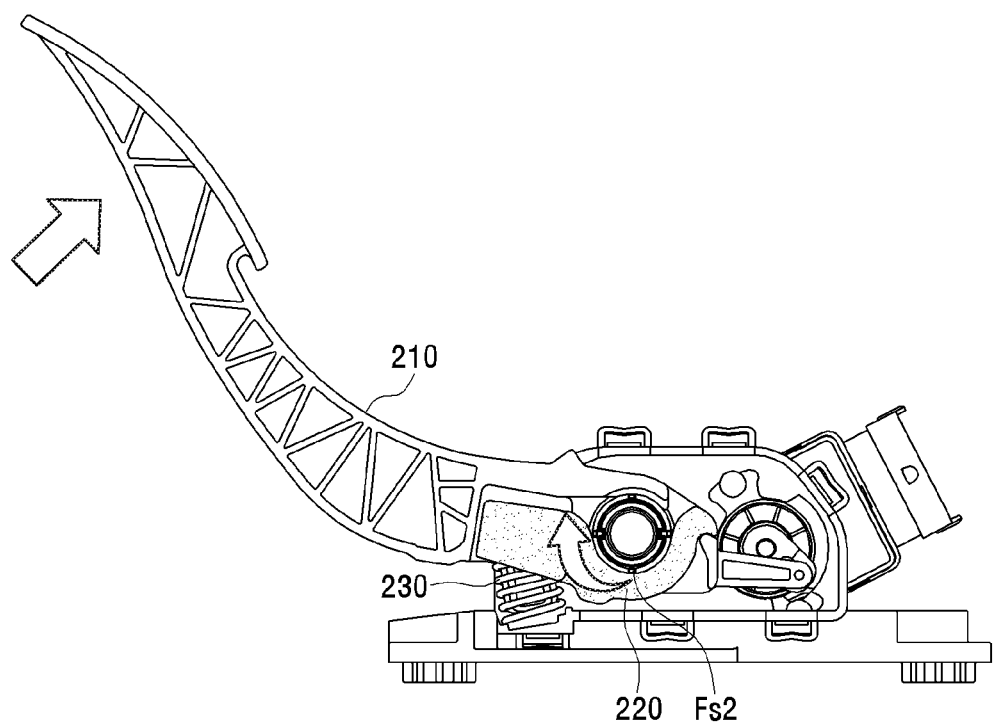

FIGS. 6a to 6b are views for describing the operation of the accelerator pedal for a vehicle according to the embodiment of the present invention.

FIG. 6a shows that the driver applies the pedal effort for acceleration. When the driver steps on the pedal pad and a predetermined force is applied, the main pedal arm 210 may rotate in the first direction, that is, counterclockwise, in close contact with the first action point $F_{p2}$ of the hinge.

As the main pedal arm 210 rotates in the first direction, the auxiliary pedal arm 220 receives the force in the first direction by contact between the inside of the receiving recess of the rotating main pedal arm 210 and one end of the auxiliary pedal arm. Thus, the spring coupled to the bottom of the auxiliary pedal arm 220 may be compressed. That is, the force applied to the main pedal arm 210 is transmitted to the spring, and then the spring is compressed.

As a result, as the driver applies the pedal effort to the pedal pad 100, a frictional force increases at the first action point between the main pedal arm 210 and the hinge, thereby generating hysteresis.

FIG. 6b shows that the driver removes the pedal effort from the pedal pad. When the driver takes his/her foot off the pedal pad and the force applied to the main pedal arm 210 is removed, the auxiliary pedal arm 220 may rotate in the second direction, clockwise, in close contact with the second action point $F_{s2}$ of the hinge by the elastic force of the spring 230

As the auxiliary pedal arm 220 rotates in the second direction, the force may be applied in the second direction by contact between the inside of the receiving recess of the rotating main pedal arm 210 and one end of the auxiliary pedal arm.

As a result, even though the driver removes the pedal effort from the pedal pad 100, a frictional force is generated at the second action point between the auxiliary pedal arm 220 and the hinge, thereby generating hysteresis.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

REFERENCE NUMERALS

100: pedal pad
200: pedal arm
210: main pedal arm
220: auxiliary pedal arm
230: spring
300: housing
310: first housing
320: second housing
330: hinge

What is claimed is:

1. An accelerator pedal for a vehicle, the accelerator pedal comprising:
a housing;
a cylindrical hinge which is connected to the housing;
a main pedal arm which is coupled to one side of the hinge and rotates in a first direction in contact with a first action point of the one side of the hinge when a predetermined force is applied, wherein the first action point is located in a region within an outer circumference of the one side of the hinge in which friction occurs by contacting the main pedal arm and the hinge;
an auxiliary pedal arm which is coupled to another side of the hinge and rotates in a second direction in contact with a second action point of the other side of the hinge by an elastic force when the force applied to the main pedal arm is removed, wherein the second action point is located in a region within an outer circumference of the other side of the hinge in which friction occurs by contacting the auxiliary pedal arm and the hinge; and
a spring which is coupled to a bottom of one end of the auxiliary pedal arm and applies the elastic force to the auxiliary pedal arm;
wherein the main pedal arm comprises a receiving recess formed in a lower portion thereof fixed to the housing, and wherein the main pedal arm comprises through-holes to which the hinge is inserted and coupled and which are formed on both sides of the receiving recess; and
wherein the auxiliary pedal arm is inserted into the receiving recess, wherein an insertion recess to which the spring is inserted and coupled is formed in a lower portion of one end of the auxiliary pedal arm, and wherein a contact surface which has a predetermined curvature so as to come in contact with the outer circumference of the other side of the hinge is formed in an upper portion of the other end of the auxiliary pedal arm.

2. The accelerator pedal for a vehicle of claim 1, wherein, in the main pedal arm, the contact surface which has a predetermined curvature so as to come in contact with the outer circumference of the one side of the hinge is formed inside the receiving recess disposed between the through-holes to which the hinge is inserted and coupled.

3. The accelerator pedal for a vehicle of claim 1, wherein a protrusion is formed on one surface of the insertion recess formed in the auxiliary pedal arm, and wherein the protrusion is disposed to be inserted into the inside of the spring.

4. The accelerator pedal for a vehicle of claim 1, wherein an opening is formed above the through-holes formed in the main pedal arm, and wherein the other end of the auxiliary pedal arm is disposed to be inserted into the opening.

5. The accelerator pedal for a vehicle of claim 1, wherein the main pedal arm transmits the force to the auxiliary pedal arm while rotating in the first direction in contact with the first action point of the hinge, so that the spring coupled to the bottom of the one end of the auxiliary pedal arm is compressed.

6. The accelerator pedal for a vehicle of claim 1, wherein the auxiliary pedal arm transmits the force to the main pedal arm while rotating in the second direction in contact with the second action point of the hinge by the elastic force of the coupled spring.

7. The accelerator pedal for a vehicle of claim 1, wherein the housing comprises a first housing and a second housing, and wherein a protrusion to which the hinge is coupled is formed inside the first housing.

8. The accelerator pedal for a vehicle of claim 7, wherein a groove is formed on at least one side of the protrusion in a longitudinal direction of the protrusion, and wherein a projection which is inserted into the groove of the protrusion is formed inside the hinge.

9. An accelerator pedal for a vehicle, the accelerator pedal comprising:
a housing;
a cylindrical hinge which is connected to the housing;
a main pedal arm which is coupled to one side of the hinge and rotates in a first direction in contact with a first action point of the one side of the hinge when a predetermined force is applied, wherein the first action point is located in a region within an outer circumference of the one side of the hinge in which friction occurs by contacting the main pedal arm and the hinge;
an auxiliary pedal arm which is coupled to another side of the hinge and rotates in a second direction in contact with a second action point of the other side of the hinge by an elastic force when the force applied to the main pedal arm is removed, wherein the second action point is located in a region within an outer circumference of the other side of the hinge in which friction occurs by contacting the auxiliary pedal arm and the hinge; and
a spring which is coupled to a bottom of one end of the auxiliary pedal arm and applies the elastic force to the auxiliary pedal arm;
wherein the housing comprises a first housing and a second housing, and wherein a protrusion to which the hinge is coupled is formed inside the first housing; and
wherein a groove is formed on at least one side of the protrusion in a longitudinal direction of the protrusion, and wherein a projection which is inserted into the groove of the protrusion is formed inside the hinge.

10. The accelerator pedal for a vehicle of claim 9, wherein the main pedal arm transmits the force to the auxiliary pedal arm while rotating in the first direction in contact with the first action point of the hinge, so that the spring coupled to the bottom of one end of the auxiliary pedal arm is compressed.

11. The accelerator pedal for a vehicle of claim 9, wherein the auxiliary pedal arm transmits the force to the main pedal arm while rotating in the second direction in contact with the second action point of the hinge by the elastic force of the coupled spring.

* * * * *